July 3, 1923.
R. M. SEARLE
READING APPLIANCE
Filed Nov. 16, 1921
1,460,924
3 Sheets-Sheet 1
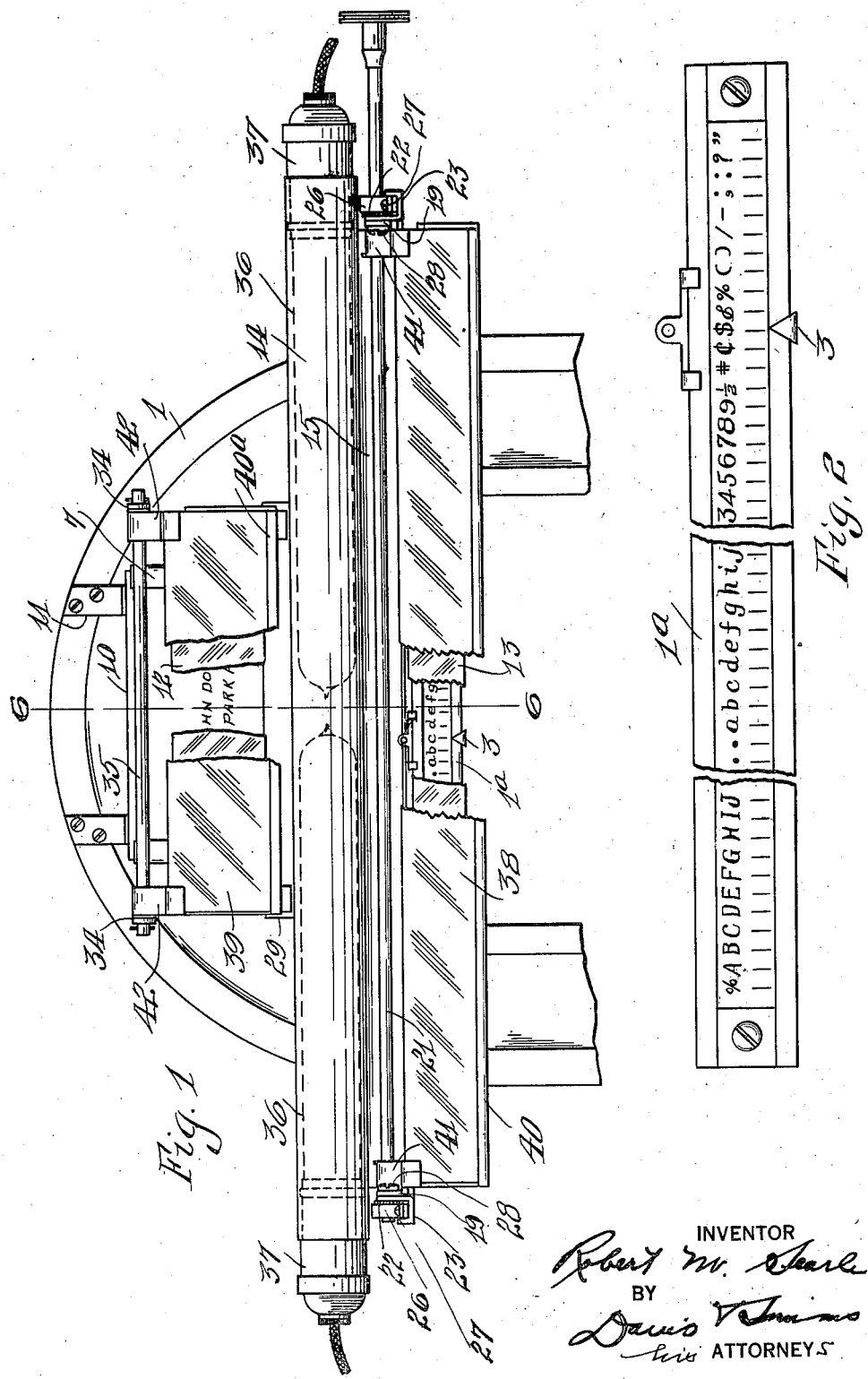
INVENTOR
Robert M. Searle
BY
Davis
ATTORNEYS

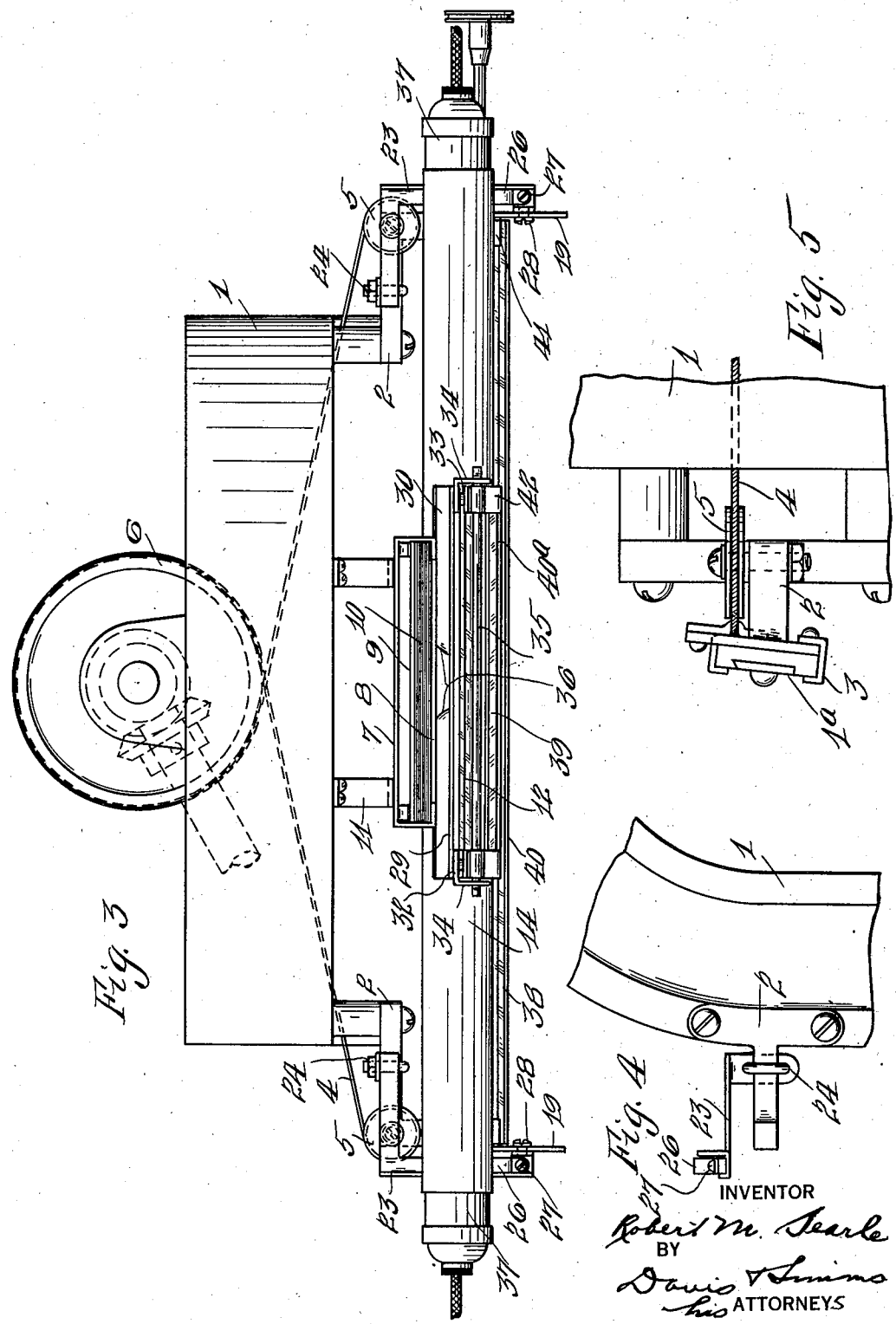

July 3, 1923.
R. M. SEARLE
READING APPLIANCE
Filed Nov. 16, 1921
1,460,924
3 Sheets-Sheet 3
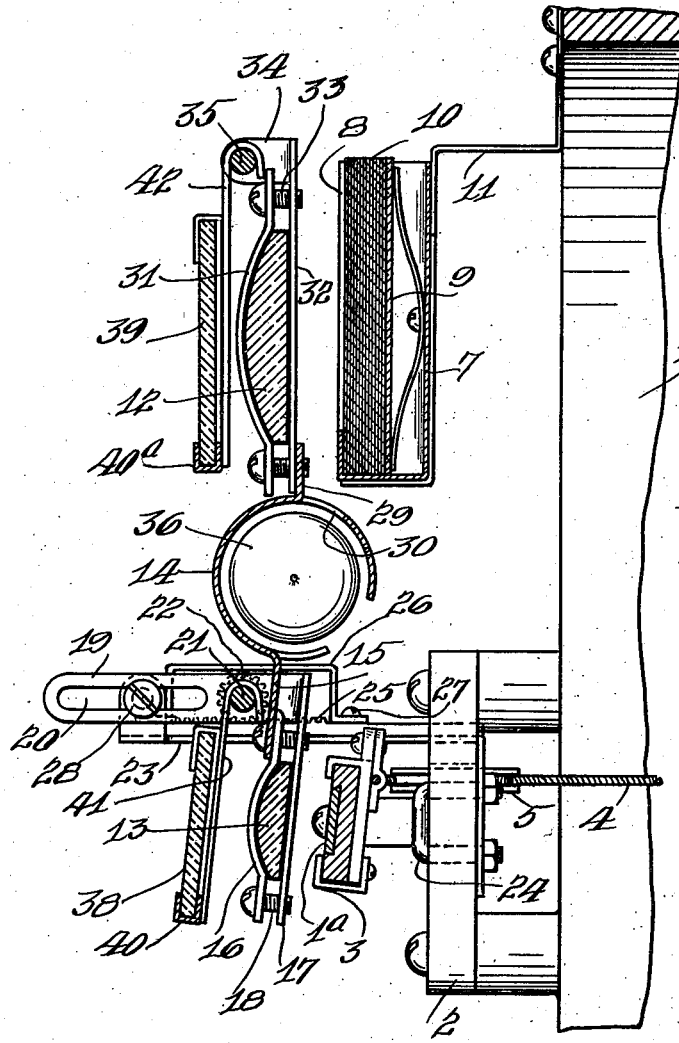
Fig. 6
Fig. 7
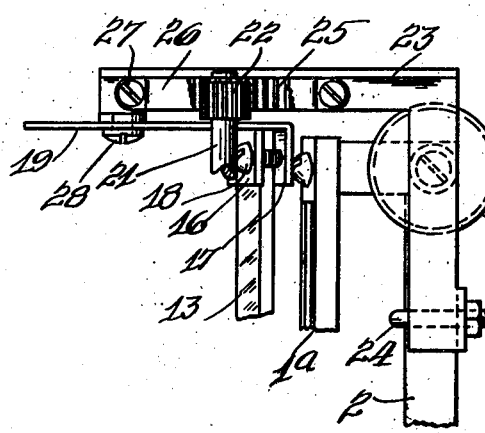
INVENTOR
Robert M. Searle
BY
his ATTORNEYS Patented July 3, 1923.

1,460,924

UNITED STATES PATENT OFFICE.

ROBERT M. SEARLE, OF ROCHESTER, NEW YORK.

READING APPLIANCE.

Application filed November 16, 1921. Serial No. 515,733.

*To all whom it may concern:*

Be it known that I, ROBERT M. SEARLE, a citizen of the United States, and resident of Rochester, in the county of Monroe and State of New York, have invented certain new and useful Improvements in Reading Appliances, of which the following is a specification.

The present invention relates to reading appliances and more particularly to the type designed for illuminating a field to be viewed, an object of this invention being to provide an improved construction by which the rays from an illuminating means may be properly distributed over the field to be viewed, while direct rays from the illuminating means will be prevented from entering the eyes of the viewer or reader. Another object of the invention is to provide means for illuminating two adjacent fields by means of a common illuminating means without the direct rays from the illuminating means passing to the eyes of the viewer or reader. Still another object of the invention is to provide a reading appliance designed for use on a machine which employs an indicator for determining the adjustment of a suitable member on the machine.

To these and other ends, the invention consists of certain parts and combinations of parts, all of which will be hereinafter described, the novel features being pointed out in the appended claims.

In the drawings:

Fig. 1 is a fragmentary view of an embossing machine showing the reading appliance attached thereto, parts being broken away;

Fig. 2 is a fragmentary view of the indicator of an embossing machine;

Fig. 3 is a plan view of a portion of the embossing machine showing the reading appliance associated with the copy holder and the indicating means;

Fig. 4 is a detail view showing the manner in which the reading appliance is supported upon the embossing machine;

Fig. 5 is a detail side view showing the manner in which the indicator is supported and operated;

Fig. 6 is a section through the reading appliance on the line 6—6, Fig. 1 showing the manner in which the reading appliance is associated with the copy holder and the indicator; and Fig. 7 is a detail view showing the manner in which the reading appliance is adjustable with reference to the copy holder and the indicator.

Referring more particularly to the drawings, 1 indicates the frame of the machine to which the reading appliance has been applied, this machine, in this instance, being the frame of an embossing machine of the type known as the Graphotype, manufactured by the Addressograph Company of Chicago, Illinois. It is apparent, however, that the invention is not limited to machines of this type. In the embodiment herein illustrated, there is provided a stationary indicator 1ª in the form of an elongated bar supported on the front of the machine preferably by two bracket arms 2. On this indicator bar is movably mounted an indicator 3 which is operated by means of a cable 4 connected to opposite sides thereof, and passing around pulleys 5 to a drum 6 which connects with the embossing member (not shown). Also supported on the frame is a copy holder which, in this instance, is in the form of a receptacle 7 having an open front wall 8 and a spring pressed follower 9 therein acting on the copy contained on cards 10, this copy holder, in this instance, being supported from the frame 1 by a bracket 11. No claim is herein made to any of the foregoing parts per se, as the same are well-known features found in the Graphotype above mentioned.

The reading appliance embodies, in this instance, two elongated lenses 12 and 13, the lens 12 being substantially co-extensive with the copy holder and the lens 13 being substantially co-extensive with the indicator bar. These lenses are mounted upon a common frame which, in this instance, embodies a central member 14 in the shape of an elongated lamp housing of substantially tubular formation. This lamp housing has a depending flange 15 and to this flange lens clamps are secured. In this instance, each lens clamp embodies a front member 16 and a back member 17 secured together by screws 18 arranged above and below the lens 13. The back members 17 of the two clamps at the opposite ends of the lens 13 have forwardly extending arms 19 and these arms are slotted at 20 near their outer ends. The arms are also connected by a shaft 21 which turns therein and carries gears 22 on the outer faces of the arms 19. These gears 22 with the walls of the slots 20 are utilized for supporting the lens carrying frame and adjusting the lenses toward and from the indicator bar 1a and the copy holder 7, this result being secured by providing brackets extending forwardly from the machine. In this instance, these brackets are in the form of L shaped members 23 each having one arm secured by a clamp 24 to one of the arms 2 which support the indicator bar, the other arm of the bracket extending forwardly beyond the indicator bar and having on their upper surfaces rack teeth 25 with which the gears 22 mesh. With the end in view of maintaining the gears 22 in cooperation with the rack teeth 25, straps 26 engage over the gears and are secured by screws 27 to the bracket arms 23. Each bracket arm 23 also carries on its inner face, a headed projection 28 which extends through the slot 20 of an arm 19 and cooperates with the walls of the slot to assist in the guiding of the lens supporting frame.

The reading lens 12 for the copy holder is supported by providing the housing 14 with a flange or tongue 29 cut from the metal of the housing and turning upwardly to provide a slot 30, the purpose of which will be hereinafter described. This tongue 29 has the lens clamps secured thereto. In this instance, these lens clamps embody front members 31 and back members 32 connected together by clamping screws 33 lying on opposite sides of the lens 12. Each back member 32 has, in this instance, a forwardly extending arm 34 and these forwardly extending arms are connected by a rod 35.

The illuminating means, in this instance, embodies two electric incandescent bulbs 36, the sockets 37 of which are fitted in opposite ends of the tubular casing 14 holding said lamps centrally positioned within said casing. The rays from these lamps pass downwardly from the housing between the indicator and the lens 13 and also upwardly from the housing through the opening 30 between the copy holder and the lens 12, thus illuminating both the indicator bar and the copy holder from a common source.

With the end in view of modifying from the rays reflected from the two fields, there is provided, for the indicator, a lens 38 of so-called day light producing glass, and, for the copy holder, a lens 39 of the same kind of glass. In this instance, these two lenses are removably supported in front of the reading lenses 12 and 13, and to this end, the lens 38 has a frame 40 which is provided with hooked shaped hangers 41 engageable over the rod 21 so that the lens 38 will be supported in a pendant condition in front of the reading lens 13. The lens 39 has its frame 40a provided with hooked shaped hangers 42 which engage over the rod 35 and support the lens 39 in a pendant condition in front of the reading lens 12.

From the foregoing it will be seen that there has been provided, in connection with the indicator of an embossing or other marking machine, a reading lens combined with an illuminating means which will illuminate the indicating means, while at same time, holding direct rays from the illuminating means from the eyes of the viewer or reader. The lens is adjustable with reference to the indicating means and may have also associated therewith a so-called day light producing lens or glass for eliminating undesirable reflected rays from the illuminating means. The adjusting means for effecting the adjustment of the lens is of simple construction and is not liable to get out of order. There has also been provided a reading glass for the copy holder of an embossing or marking machine. This reading glass has an illuminating means in common with the illuminating means of the indicator and is simultaneously adjustable with the reading glass and the indicator so that the reader or viewer may obtain the same focus simultaneously on the indicator and the copy holder. This reading glass for the copy holder also has associated with it a so-called day light producing lens or glass which removes the undesirable rays reflected from the copy holder.

What I claim as my invention and desire to secure by Letters Patent is:

1. The combination with an indicator bar and a copy holder arranged above the bar, of arms extending outwardly at opposite ends of the indicator bar, a frame movable toward and from the indicator bar on said arms, two lenses carried by said frame, one associated with the indicator bar and the other associated with the lenses and means on the frame closing the space between the two lenses.

2. The combination with the indicator bar and a copy holder, of two reading lenses, one associated with the indicator bar and the other with the copy holder and a common illuminating means for illuminating and throwing rays in rear of the two lenses and upon the copy holder and the indicator bar, said illuminating means having associated therewith means for preventing direct rays from the illuminating means being received by the eyes of one viewing the copy holder and the indicator bar.

3. The combination with the indicator bar and a copy holder, of two lenses, one associated with the indicator bar and the other associated with the copy holder, and a lamp housing arranged to close the space between the lenses and constructed to discharge rays in rear of the lenses upon the copy holder and the indicator bar.

4. The combination with a field to be viewed, and an elongated tubular lamp housing having a longitudinally extending tongue cut from the housing to provide an opening through which rays may issue upon the field to be viewed, and an elongated reading lens supported from said tongue of the lamp housing.

5. The combination with a field to be viewed, of an elongated lamp housing, a tongue cut from said housing to provide an opening through which the rays may issue upon the field to be viewed, an elongated lens arranged in front of the field to be viewed, and two clamps arranged at opposite ends of the lens, and secured to said tongue, each clamp embodying a front member and a back member, and screws connecting said members on opposite sides of the lens.

6. The combination with a field to be viewed, of an elongated lamp housing, a tongue cut from said housing to provide an opening through which the rays may issue upon the field to be viewed, an elongated lens arranged in front of the field to be viewed, and two clamps arranged at opposite ends of the lens, and secured to said tongue, each clamp embodying a front member and a back member, and screws connecting said members on opposite sides of the lens, arms projecting forwardly from said clamps, a rod connecting said arms, and a light filter supported by said rod.

7. The combination with two fields to be viewed, of two lenses one for each field, means closing the space between the lenses, and a lamp arranged in rear of said space closing means.

ROBERT M. SEARLE.